(12) United States Patent
Gibbs et al.

(10) Patent No.: US 6,666,578 B2
(45) Date of Patent: Dec. 23, 2003

(54) RTD ASSEMBLY, AND TEMPERATURE SENSING SYSTEM AND EXCITATION CONTROL SYSTEM EMPLOYING AN RTD ASSEMBLY

(75) Inventors: Irving A. Gibbs, Fletcher, NC (US); Leisa L. Wishon, Statesville, NC (US)

(73) Assignee: Eaton Corporation, Cleveland, OH (US)

( * ) Notice: Subject to any disclaimer, the term of this patent is extended or adjusted under 35 U.S.C. 154(b) by 154 days.

(21) Appl. No.: 10/044,795

(22) Filed: Jan. 11, 2002

(65) Prior Publication Data
US 2003/0132734 A1 Jul. 17, 2003

(51) Int. Cl.$^7$ .................................................. G01K 1/08
(52) U.S. Cl. ...................................................... 374/142
(58) Field of Search ............................ 374/141, 142, 374/152, 153, 163, 210; 338/9, 20, 228, 233, 238, 244, 246, 250, 257, 258, 262, 292, 330; 323/266, 268

(56) References Cited

U.S. PATENT DOCUMENTS

| | | | |
|---|---|---|---|
| 4,245,613 A | | 1/1981 | Wells et al. |
| 4,937,552 A | * | 6/1990 | Lam .............................. 338/25 |
| 5,040,724 A | | 8/1991 | Brinkruff et al. |
| 5,117,216 A | * | 5/1992 | McQueen ..................... 338/24 |
| 5,666,593 A | * | 9/1997 | Amico .......................... 399/69 |
| 5,674,009 A | | 10/1997 | Stark |
| 6,007,239 A | | 12/1999 | Nickol |
| 6,203,191 B1 | | 3/2001 | Mongan |
| 6,232,751 B1 | * | 5/2001 | Farr et al. ...................... 322/59 |
| RE37,423 E | | 10/2001 | Glennon et al. |
| 6,354,736 B1 | * | 3/2002 | Cole et al. ................... 374/185 |

OTHER PUBLICATIONS www.analog.com, "3B34 Isolated, Linearized RTD Input", Analog Devices Technologies/Applications, IOS Catalog, Nov. 7, 2001, 5 pp.

\* cited by examiner

*Primary Examiner*—Matthew V. Nguyen
(74) *Attorney, Agent, or Firm*—Martin J. Moran

(57) ABSTRACT

An RTD assembly includes a resistance temperature detector having two outputs, and a pair of electrical conductors including a first end and a second end. The electrical conductors are electrically connected at the second end thereof to the outputs of the resistance temperature detector. An electrically insulating polytetrafluoroethylene body, such as Teflon®, includes a closed end, a cavity and an open end. The resistance temperature detector is disposed within the cavity of the electrically insulating body and proximate the closed end thereof. The electrical conductors extend from the cavity of the electrically insulating body with the first end of the electrical conductors being external to the electrically insulating body. A cured potting compound is disposed within the cavity of the electrically insulating body and about the resistance temperature detector and the second end of the electrical conductors.

20 Claims, 2 Drawing Sheets

RTD ASSEMBLY, AND TEMPERATURE SENSING SYSTEM AND EXCITATION CONTROL SYSTEM EMPLOYING AN RTD ASSEMBLY

BACKGROUND OF THE INVENTION

1. Field of the Invention

The present invention relates to temperature sensing and, more particularly, to Resistance Temperature Detector (RTD) temperature sensing. The invention also relates to temperature sensing systems and excitation control systems employing an RTD to sense temperature.

2. Background Information

A Resistance Temperature Detector (RTD) senses temperature by providing a variable electrical resistance of a metal, which resistance changes with temperature. Platinum is the most commonly used metal for RTDs due to its stability and nearly linear temperature versus resistance relationship. Platinum also has the advantages of chemical inertness, a temperature coefficient of resistance that is suitably large in order to provide readily measurable resistance changes with temperature, and a resistance which does not drastically change with strain. Other types of RTDs include copper, nickel and nickel alloys.

The RTD's resistance versus temperature relationship is qualified by a term known as "alpha". "Alpha" is the average percent change in resistance per ° C. of an RTD between 0° C. and 100° C. For a 100 Ω platinum RTD, 0.00385Ω/Ω/° C. is the most common alpha. Alpha is also referred to as the temperature coefficient of resistance.

Circuits for sensing temperature from a variable RTD resistance are well known in the art. See, for example, U.S. Pat. Nos. 5,040,724; 6,007,239; and 6,203,191.

Modem excitations systems typically measure the temperature of a thyristor heat sink assembly. Two-, three- and four-wire configurations may be employed in electrically connecting the RTD to the temperature sensing circuit. The sensed temperature, in turn, is employed by the excitation system to determine that the thyristor bridge is operating within suitable temperature design margins. Typically, a generator alarm or trip results when the temperature exceeds a predetermined threshold.

Because the thyristor bridge is directly electrically connected to a relatively high voltage source, suitable isolation is required. The isolation is conventionally provided by the RTD imbedded in an insulation material within a conductive housing.

Conventional technology encapsulates the RTD in a metal case and employs metal hardware, including springs, to apply positive pressure to the RTD in order to properly measure the temperature of the heat sink. A problem with such metal cases is that they reduce the creapage and clearance of the thyristor bridge with respect to ground and also make it difficult to obtain a high pot voltage required by the RTD.

Process connection fittings for RTDs include compression fittings, welded or spring-loaded National Pipe Tapered (NPT) fittings, or bayonet fittings. See, for example, U.S. Pat. Nos. 4,245,613; and 5,674,009.

A ferrule may be employed inside a compression fitting to provide a leak or a gas-tight seal. A ferrule is a small machined ring, which allows the compression fitting to be fixed onto the RTD when the compression fitting is tightened. Ferrules are available in nylon, Teflon® and lava (adjustable depth) brass and stainless steel (permanent depth).

As another example, when an RTD is installed with a ½ in.×½ in. NPT fitting, the RTD is inserted into the process hole or opening, and the probe is tightened into place by turning the probe into the threaded connection.

There is room for improvement in RTD temperature sensing, and in temperature sensing systems and excitation control systems employing RTDs.

SUMMARY OF THE INVENTION

This need and others are met by the present invention, which simplifies conventional RTD assembly technology by eliminating metal components and employing an RTD within an electrically insulating body of suitable dimension, which body is inserted into an opening of a sensed device, such as a heat sink.

As one aspect of the invention, an RTD assembly comprises: a resistance temperature detector including two outputs; a pair of electrical conductors including a first end and a second end, the electrical conductors being electrically connected at the second end thereof to the outputs of the resistance temperature detector; an electrically insulating body including a closed end, a cavity and an open end, the resistance temperature detector being disposed within the cavity of the electrically insulating body and proximate the closed end thereof, the electrical conductors extending from the cavity of the electrically insulating body with the first end of the electrical conductors being external to the electrically insulating body; and a potting material disposed within the cavity of the electrically insulating body and about the resistance temperature detector and the second end of the electrical conductors.

The electrically insulating body may be made of polytetrafluoroethylene and may have a cylindrical shape.

As another aspect of the invention, an excitation control system comprises: a rectifier bridge including a heat sink having a temperature and also including a semiconductor device, the heat sink having an opening therein; an RTD assembly comprising: a resistance temperature detector including two outputs having a temperature dependent resistance therebetween, a pair of electrical conductors including a first end and a second end, the electrical conductors being electrically connected at the second end thereof to the outputs of the resistance temperature detector, an electrically insulating body including a closed end, a cavity and an open end, the resistance temperature detector being disposed within the cavity of the electrically insulating body and proximate the closed end thereof, the electrical conductors extending from the cavity of the electrically insulating body with the first end of the electrical conductors being external to the electrically insulating body, a portion of the electrically insulating body proximate the closed end thereof engaging the heat sink at the opening thereof, and a potting material disposed within the cavity of the electrically insulating body and about the resistance temperature detector and the second end of the electrical conductors; a circuit adapted to control the rectifier bridge; and a circuit receiving the first end of the electrical conductors of the RTD assembly, the circuit adapted to sense the temperature of the heat sink from the temperature dependent resistance of the resistance temperature detector.

The electrically insulating body of the RTD assembly may be made of polytetrafluoroethylene. The opening of the heat sink may be cylindrical, and the electrically insulating body may have a cylindrical shape.

As another aspect of the invention, a temperature sensing system comprises: a heat sink having a temperature and having an opening therein; an electrical device mounted on the heat sink; an RTD assembly comprising: a resistance temperature detector including two outputs having a temperature dependent resistance therebetween, a pair of electrical conductors including a first end and a second end, the electrical conductors being electrically connected at the second end thereof to the outputs of the resistance temperature detector, an electrically insulating body including a closed end, a cavity and an open end, the resistance temperature detector being disposed within the cavity of the electrically insulating body and proximate the closed end thereof, the electrical conductors extending from the cavity of the electrically insulating body with the first end of the electrical conductors being external to the electrically insulating body, a portion of the electrically insulating body proximate the closed end thereof engaging the heat sink at the opening thereof, and a potting material disposed within the cavity of the electrically insulating body and about the resistance temperature detector and the second end of the electrical conductors; and a circuit receiving the first end of the electrical conductors of the RTD assembly, the circuit adapted to sense the temperature of the heat sink from the temperature dependent resistance of the resistance temperature detector.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with a rectifier heat sink for an excitation control system, although the invention is applicable to a wide range of heat sinks (e.g., without limitation, a power supply heat sink, heat sinks for AC or DC drives, heat sinks for AC or DC motors or generators, heat sinks for power electrical components, such as diodes) and other temperature sensing applications (e.g., without limitation, liquid temperature measurements, other applications in which insulation is needed between the RTD and the heat generating device or material).

Figure 1:
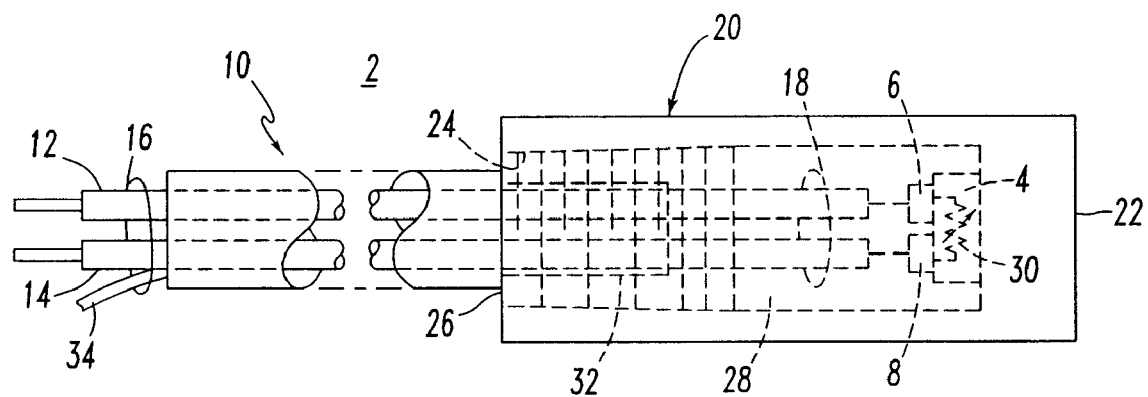
FIG. 1 is a plan view of an RTD assembly in accordance with the present invention.

Referring to FIG. 1, an RTD assembly 2 in accordance with the present invention includes a resistance temperature detector 4 (shown in hidden line drawing in FIG. 1) having two electrical output terminals 6,8. A cable 10 includes a pair of insulated electrical conductors 12,14, which extend from a first end 16 to a second end 18. The electrical conductors 12,14 are electrically connected at the second end 18 of the cable 10 to the respective RTD output terminals 6,8.

Figure 2:
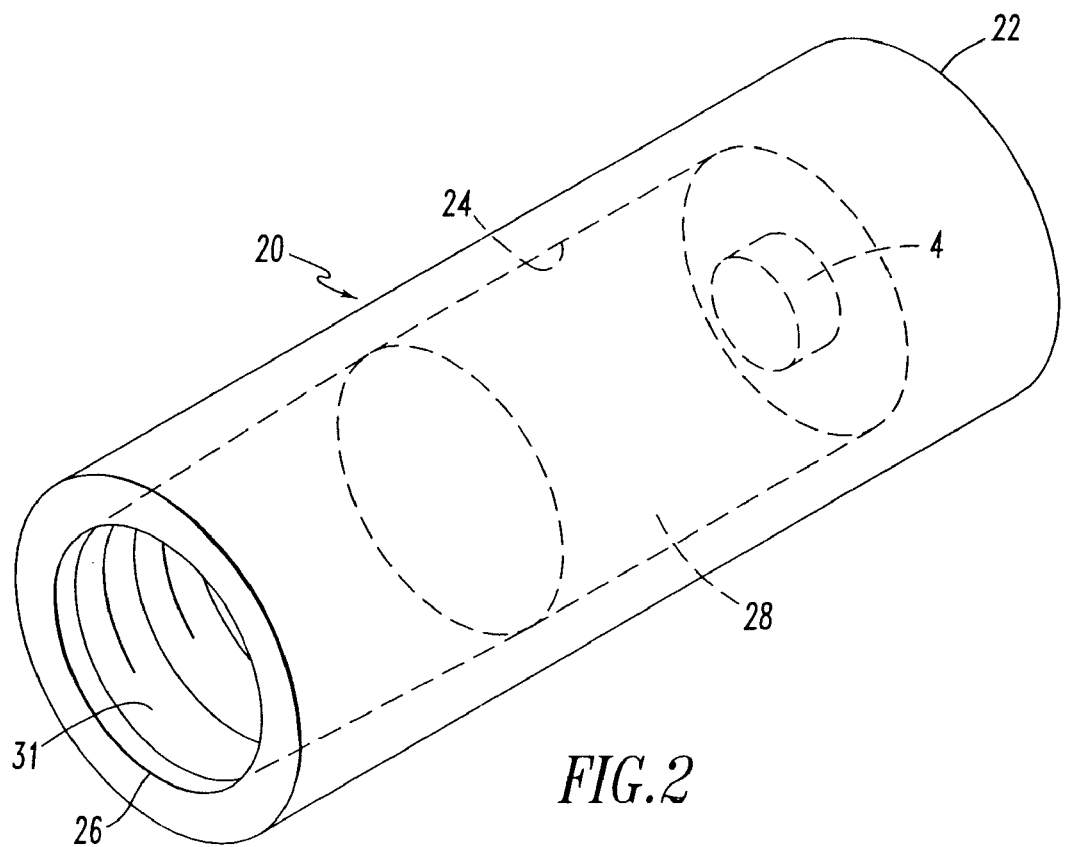
FIG. 2 is an isometric view of the electrically insulating body of FIG. 1.

Also referring to FIG. 2, an electrically insulating body 20 includes a closed end 22, a cavity 24 and an open end 26. The RTD 4 (shown in phantom line drawing in FIG. 2) is disposed within the cavity 24 of the electrically insulating body 20 and proximate the closed end 22 thereof. The electrical conductors 12,14 extend from the cavity 24 with the first end 16 of the electrical conductors 12,14 being external to the electrically insulating body 20. A suitable potting material 28 is disposed within the cavity 24 of the electrically insulating body 20 and about the RTD 4 and the second end 18 of the electrical conductors 12,14.

EXAMPLE

The exemplary RTD 4 is a platinum, 100 Ω @ 0° C., alpha curve=0.00385±0.12%Ω @ 0° C., 2 wire, single thin film element. The outputs 6,8 of the RTD 4 have a temperature dependent resistance 30 therebetween. The exemplary electrically insulating body 4 is made of solid polytetrafluoroethylene (PTFE) (e.g., Teflon®) having a cylindrical shape. This material is rated to about 260° C. and has a diameter of about 0.345 in.±0.001 in. and an overall length of about 1.50 in. The cavity 24 has a generally cylindrical shape, which is formed by drilling the body 4 with about a 1.125 in. deep, about 0.166 in. center line hole, and leaving the process end 22 closed and the cold end 26 open. The open (cold side) end 26 is tapped 10–32 at the open end 31 of the cavity 24, which advantageously provides potting grooves. The RTD 4 is inserted at the bottom (toward the right side of FIG. 1) of the cavity 24, at a position which is about 0.375 in. from the closed end 22.

The cavity 24 of the body 4 is completely potted with the potting material 28, such as a flexible epoxy, which is rated to about 232° C., and suitably cured. For example, a potting compound #5, from JMS Southeast, Inc. of Statesville, N.C., is employed. Once the potting material 28 cures, the RTD assembly 2 is extremely robust against thermal shock, humidity, moisture, mechanical shock, vibration, mechanical crush, terminal push and/or pull. Alternatively, a wide range of potting materials (e.g., epoxy; thermosetting resin used as an adhesive) may be employed. Preferably, an insulating potting material is employed.

The electrical conductors 12,14 of the exemplary cable 10 are 24 AWG stranded wires with Teflon® insulation. The cable 10 includes a conventional shield 32 and a conventional drain wire 34 electrically connected to the shield 32. The drain wire 34 and the shield 32 are cut back away from the RTD 4 and, thus, are electrically isolated from the RTD 4. Preferably, the conductors 12,14 and drain wire 34 are suitably electrically connected to terminals (not shown). The cable 10 is rated to about 204° C. and has a suitable length in order to permit interconnection of the terminals with a temperature sensing circuit (not shown) at the one end 16 and the closed end 22 of the body 4 with a sensed device (e.g., a heat sink) (not shown) at the opposite end. The Teflon® insulation of the conductors 12,14 has a relatively high dielectric strength, a relatively low dielectric constant, relatively low loss factors, and a relatively extremely high specific resistance. The RTD assembly 2 is designed to sense temperatures of up to about 125° C.

Figure 3:
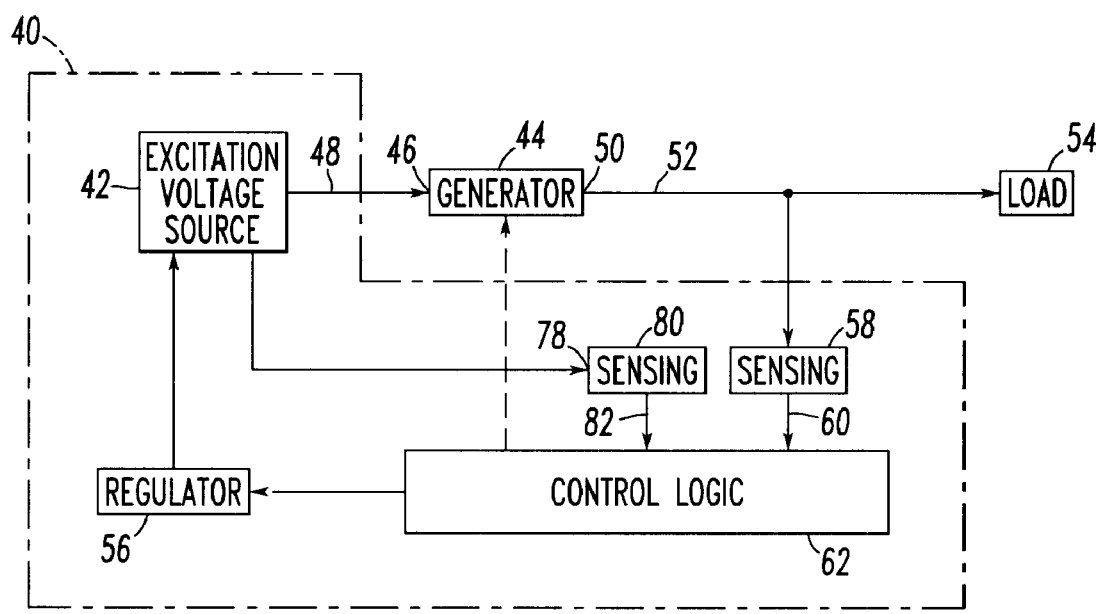
FIG. 3 is a block diagram of an excitation control system including a rectifier circuit having a heat sink and also including a temperature sensing circuit in accordance with another embodiment of the invention.

FIG. 3 shows an excitation control system 40 including an excitation voltage source 42. Examples of an excitation control system are disclosed in U.S. Pat. Nos. 6,208,120; and 6,232,751, which are incorporated by reference herein. The exemplary excitation control system 40 is for a rotating electrical apparatus, such as the exemplary generator 44. The generator 44 includes an input 46 responsive to an excitation voltage 48 and an output 50 having one or more alternating current phases 52, each having a current flowing therein and a voltage, which supply power to a load 54. One or more circuit breakers (not shown) may be disposed between the generator 44 and the load 54. The excitation voltage source 42 provides the excitation voltage 48 to the input 46 of the generator 44. A regulator, such as a bridge control circuit 56 adapted to control the rectifier bridge 42, regulates the excitation voltage 48. A first sensing subsystem 58 for the alternating current phases 52 senses generator current and/or generator voltage and provides an electrical signal 60 (e.g., generator line current, generator watts) to control logic 62 for the regulator 56 and generator 44.

Figure 4:
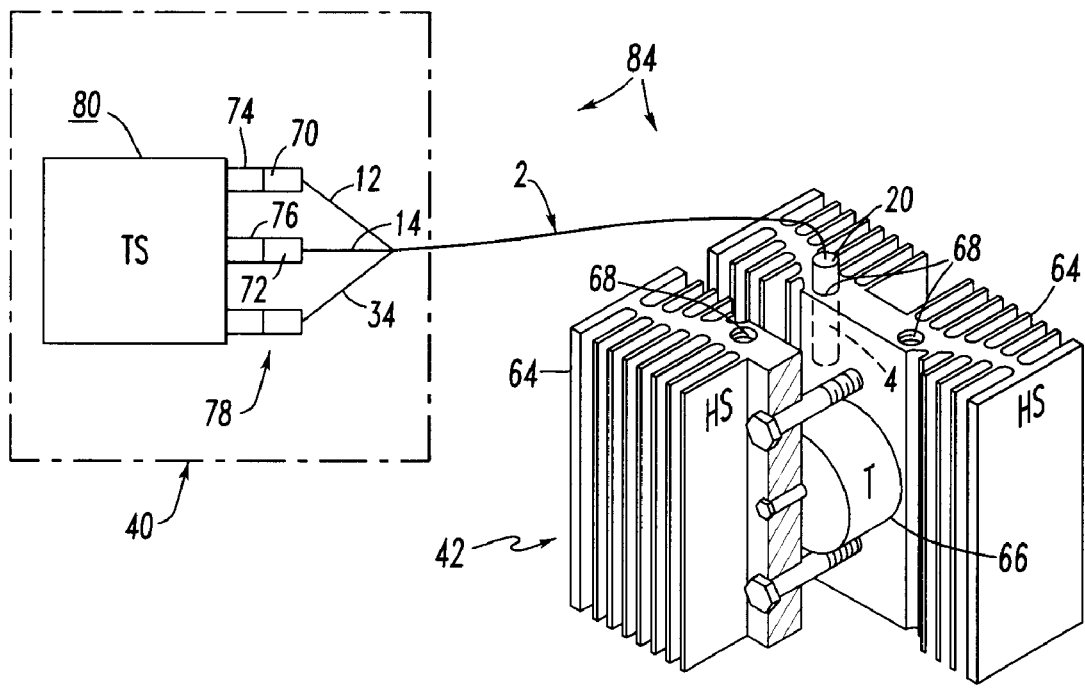
FIG. 4 is an isometric view of the heat sink of FIG. 3.

The excitation control system 40 employs the excitation voltage source 42, which in the exemplary embodiment is a three-phase rectifier circuit, to convert alternating current (AC) sinusoidal signal waveforms to direct current (DC). The three-phase rectifier circuit 42 includes one or more heat sinks (HS) 64 (one is shown in FIG. 4) and a plurality of semiconductor devices, such as the exemplary thyristors (T) 66 or semiconductor controlled rectifiers (SCRs), disposed in bridge segments, with typically one thyristor 66 or SCR for each polarity of each AC phase. The regulator 56 includes a bridge firing control circuit (not shown) to control the firing point for each thyristor 66 in each AC cycle.

As shown in FIG. 4, the heat sink 64 includes a cylindrical opening 68 with the electrically insulating body 4 of the RTD assembly 2 of FIG. 1 being suitable engaged (e.g., force fitted) with the heat sink 64 at the opening 68 thereof. Preferably, a suitable thermal compound (not shown) is disposed in the opening 68 on the closed end 22 of the body 4. The thyristors 66 are suitably mounted on the heat sink 64 and, during operation of the three-phase rectifier circuit 42, raise the temperature thereof. As shown in FIG. 4, the RTD assembly 2 is connected by connector terminals 70,72 to input connector terminals 74,76 with the latter terminal 76 being grounded. The terminals 74,76 comprise the input 78 of a conventional RTD temperature sensing circuit (TS) 80, which provides a temperature sensor signal 82 to the control logic 62 of FIG. 3. The circuit 80 receives the first end 16 of the electrical conductors 12,14 of the RTD assembly 2 of FIG. 1 and is adapted to sense the temperature of the heat sink 64 from the temperature dependent resistance 30 of the RTD 4.

For example, the circuit 80 may include a Model 3B34 single-channel signal conditioning module, marketed by Analog Devices, which amplifies, protects, filters, linearizes and isolates analog input voltages from a wide variety of two-, three- and four-wire RTDs, providing simultaneous precision voltage and current outputs, which are linear to input temperature.

The exemplary heat sink 64, thyristors 66, RTD assembly 2 and temperature sensing circuit 80 form a temperature sensing system 84.

The exemplary RTD assembly 2 provides a relatively simple, high voltage, isolated RTD mechanism.

Creapage and clearance of the three-phase rectifier circuit 42 are not affected when the RTD assembly 2 is employed in the exemplary excitation control system 40, because the electrically insulating body 4 employs no exterior metal or conductive parts. Furthermore, the RTD high pot is no longer an issue.

A major improvement is a reduction in the time required to install the RTD assembly 2 in the thyristor heat sink 64 with respect to known prior RTD assemblies.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An RTD assembly comprising:
   a resistance temperature detector including two outputs;
   a pair of electrical conductors including a first end and a second end, said electrical conductors being electrically connected at the second end thereof to the outputs of said resistance temperature detector;
   an electrically insulating body including a closed end, a cavity and an open end, said resistance temperature detector being disposed within the cavity of said electrically insulating body and proximate the closed end thereof, said electrical conductors extending from the cavity of said electrically insulating body with the first end of said electrical conductors being external to said electrically insulating body; and
   a potting material disposed within the cavity of said electrically insulating body and about said resistance temperature detector and the second end of said electrical conductors.

2. The RTD assembly as recited in claim 1 wherein the outputs of said resistance temperature detector have a temperature dependent resistance therebetween.

3. The RTD assembly as recited in claim 1 wherein said resistance temperature detector further includes a thin film element made of platinum.

4. The RTD assembly as recited in claim 1 wherein said electrical conductors further include a drain wire operatively associated therewith.

5. The RTD assembly as recited in claim 4 wherein said drain wire is electrically isolated from said resistance temperature detector.

6. The RTD assembly as recited in claim 1 wherein said electrical conductors are made of 24 AWG stranded wire having polytetrafluoroethylene insulation.

7. The RTD assembly as recited in claim 1 wherein said electrically insulating body is made of polytetrafluoroethylene.

8. The RTD assembly as recited in claim 1 wherein said electrically insulating body has a cylindrical shape.

9. The RTD assembly as recited in claim 8 wherein the cavity of said electrically insulating body has a generally cylindrical shape.

10. The RTD assembly as recited in claim 9 wherein the cavity of said electrically insulating body is tapped at the open end thereof.

11. The RTD assembly as recited in claim 9 wherein said electrically insulating body has a first length of about 1.5 inches; wherein the cavity of said electrically insulating body has a second length of about 1.125 inches; and wherein said resistance temperature detector is located about 0.375 inches from the closed end of said electrically insulating body.

12. The RTD assembly as recited in claim 1 wherein said potting material is made of a cured flexible epoxy.

13. The RTD assembly as recited in claim 1 wherein said resistance temperature detector and said RTD assembly are operable at a temperature of up to about 125° C.

14. An excitation control system comprising:
    a rectifier bridge including a heat sink having a temperature and also including a semiconductor device, said heat sink having an opening therein;
    an RTD assembly comprising:

a resistance temperature detector including two outputs having a temperature dependent resistance therebetween, a pair of electrical conductors including a first end and a second end, said electrical conductors being electrically connected at the second end thereof to the outputs of said resistance temperature detector, an electrically insulating body including a closed end, a cavity and an open end, said resistance temperature detector being disposed within the cavity of said electrically insulating body and proximate the closed end thereof, said electrical conductors extending from the cavity of said electrically insulating body with the first end of said electrical conductors being external to said electrically insulating body, a portion of said electrically insulating body proximate the closed end thereof engaging said heat sink at the opening thereof, and a potting material disposed within the cavity of said electrically insulating body and about said resistance temperature detector and the second end of said electrical conductors;

a circuit adapted to control said rectifier bridge; and a circuit receiving the first end of the electrical conductors of said RTD assembly, said circuit adapted to sense the temperature of the heat sink from the temperature dependent resistance of said resistance temperature detector.

15. The excitation control system as recited in claim 14 wherein the electrically insulating body of said RTD assembly is made of polytetrafluoroethylene.

16. The excitation control system as recited in claim 15 wherein the opening of said heat sink is cylindrical; and wherein said electrically insulating body has a cylindrical shape.

17. The excitation control system as recited in claim 14 wherein the cavity of said electrically insulating body has a generally cylindrical shape.

18. The excitation control system as recited in claim 17 wherein the cavity of said electrically insulating body is tapped at the open end thereof.

19. A temperature sensing system comprising:

a heat sink having a temperature and having an opening therein;

an electrical device mounted on said heat sink;

an RTD assembly comprising:

a resistance temperature detector including two outputs having a temperature dependent resistance therebetween, a pair of electrical conductors including a first end and a second end, said electrical conductors being electrically connected at the second end thereof to the outputs of said resistance temperature detector, an electrically insulating body including a closed end, a cavity and an open end, said resistance temperature detector being disposed within the cavity of said electrically insulating body and proximate the closed end thereof, said electrical conductors extending from the cavity of said electrically insulating body with the first end of said electrical conductors being external to said electrically insulating body, a portion of said electrically insulating body proximate the closed end thereof engaging said heat sink at the opening thereof, and a potting material disposed within the cavity of said electrically insulating body and about said resistance temperature detector and the second end of said electrical conductors; and a circuit receiving the first end of the electrical conductors of said RTD assembly, said circuit adapted to sense the temperature of the heat sink from the temperature dependent resistance of said resistance temperature detector.

20. The temperature sensing system as recited in claim 19 wherein the opening of said heat sink is cylindrical; and wherein said electrically insulating body has a cylindrical shape.

* * * * *